US008881783B2

(12) United States Patent
Katayama (10) Patent No.: US 8,881,783 B2
(45) Date of Patent: Nov. 11, 2014

(54) PNEUMATIC TIRE

(75) Inventor: Shinsaku Katayama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 130 days.

(21) Appl. No.: 13/500,481

(22) PCT Filed: Sep. 30, 2010

(86) PCT No.: PCT/JP2010/005902
§ 371 (c)(1),
(2), (4) Date: Apr. 5, 2012

(87) PCT Pub. No.: WO2011/043041
PCT Pub. Date: Apr. 14, 2011

(65) Prior Publication Data
US 2012/0193008 A1    Aug. 2, 2012

(30) Foreign Application Priority Data

Oct. 8, 2009   (JP) .................. 2009-234573
Oct. 15, 2009  (JP) .................. 2009-237835
Nov. 4, 2009   (JP) .................. 2009-253092

(51) Int. Cl.
*B60C 3/04*    (2006.01)
*B60C 9/28*    (2006.01)
*B60C 15/00*   (2006.01)

(52) U.S. Cl.
USPC ........... 152/454; 152/526; 152/538; 152/554; 152/555

(58) Field of Classification Search
None
See application file for complete search history.

(56) References Cited

U.S. PATENT DOCUMENTS 4,662,416 A * 5/1987 Yagi et al. ............... 152/209.14

FOREIGN PATENT DOCUMENTS

EP    2 423 004 A1    2/2012
JP    4-208609    *   7/1992
(Continued)

OTHER PUBLICATIONS

Machine translation of JP 11-301218, 1999.*
(Continued)

*Primary Examiner* — Justin Fischer
(74) *Attorney, Agent, or Firm* — Sughrue Mion, PLLC (57) ABSTRACT

There is provided a pneumatic tire having excellent uneven wear resistance performance, low rolling resistance and durability of side portion's appearance. The pneumatic tire comprises a carcass as a framework consisting of at least one carcass ply troidally extending between bead portions embedded with a pair of bead cores and turned around the bead cores from an inner side to an outer side in a tire width direction, a belt comprising at least one inclined belt layer and a tread successively disposed on a radially outer side of a crown portion of the carcass, wherein a ratio BD/BW is in a range between 0.01 and 0.04 in a section of the tire in the width direction in a state where the tire is mounted on an application rim, where BD is radius difference between radius at a central portion and radius at an end portion in the tire width direction of the outermost layer of the inclined belt layer and BW is a width of the outermost layer and CSEh is larger than SWh, where CSEh is a shortest distance from an end of a turn-up portion of the at least one carcass ply to a line drawn in parallel with a tire rotation axis at a bead toe and SWh is a shortest distance between a line drawn in parallel with the tire rotation axis at a maximum width position of the tire and the line drawn in parallel with the tire rotation axis at the bead toe.

7 Claims, 10 Drawing Sheets

(56) References Cited

FOREIGN PATENT DOCUMENTS

| | | | |
|---|---|---|---|
| JP | 5-201202 A | | 8/1993 |
| JP | 0601109 | * | 1/1994 |
| JP | 11-301218 | * | 11/1999 |
| JP | 2000-190706 A | | 7/2000 |
| JP | 2006-327502 A | | 12/2006 |
| JP | 2007-331424 A | | 12/2007 |
| JP | 2009-279948 A | | 12/2009 |
| JP | 2009-279953 A | | 12/2009 |
| JP | 2010-167849 A | | 8/2010 |
| WO | 2009/078425 A1 | | 6/2009 |

OTHER PUBLICATIONS

Japanese Office Action, dated Jun. 25, 2013, issued in corresponding Japanese Patent Application No. 2009-237835.

Japanese Office Action, dated Jun. 25, 2013, issued in corresponding Japanese Patent Application No. 2009-234573.

Japanese Office Action, dated Jul. 30, 2013, issued in corresponding Japanese Patent Application No. 2009-253092.

International Search Report, PCT/JP2010/005902, dated Oct. 26, 2010.

Extended European Search Report, dated Oct. 10, 2013, issued in corresponding European Patent Application No. 10821718.3.

Japanese Office Action, dated Feb. 4, 2014, issued in corresponding Japanese Patent Application No. 2009-253092.

Japanese Office Action issued in Japanese Application No. 2009-234573 dated Feb. 4, 2014.

Chinese Office Action issued in Chinese Application No. 201080053324.1 dated Feb. 8, 2014.

* cited by examiner

Bending neutral axis d (b)

Bending neutral axis d

PNEUMATIC TIRE

CROSS REFERENCE TO RELATED APPLICATIONS

This application is a National Stage of International Application No. PCT/JP2010/005902 filed Sep. 30, 2010, claiming priority based on Japanese Patent Application Nos. 2009-234573 filed Oct. 8, 2009, 2009-237835 filed Oct. 15, 2009 and 2009-253092 filed Nov. 4, 2009 the contents of all of which are incorporated herein by reference in their entirety.

TECHNICAL FIELD

The present invention relates to a pneumatic tire having excellent uneven wear resistance performance and low rolling resistance.

RELATED ART

In recent years, there has been actively pursued development of products having relatively little undesirable impact on the environment. This trend is due to the environmental problems including global warming and a tire is not an exception in development of such environmentally friendly products. Regarding tires, it is important to ensure performances thereof contributing to reducing fuel consumption of an automobile in order to address these environmental problems. Reducing rolling resistance of a tire has been proposed as one way of achieving such a task and various technologies have been developed in this regard.

Some of the conventional methods of decreasing rolling resistance are as follows.

First, it is known that a relatively large proportion of rolling resistance of a tire is generated in rubber of a tread portion. As a method of directly addressing this problem, it is effective to replace rubber for use in the tread portion with rubber having relatively small loss tangent. However, it is also known that other performances of the tire such as wear resistance performance are sacrificed in this method. Secondly, one can easily conceive a method of decreasing thickness of the tread portion to reduce rubber as a source of generating and increasing rolling resistance. However, in this case there arises a problem that a sufficiently long wear-resisting period cannot be ensured in the product life of the tire.

Yet further, there has been proposed decreasing rolling resistance by modifying a sectional shape of a tire in JP 2006-327502. Rolling resistance can indeed be reduced by this proposal. However, durability of side portion's appearance is not sufficient and more specified tire designing is still needed in order to achieve other performances, in particular, excellent wear resistance as well.

DISCLOSURE OF THE INVENTION

Problems to be Solved by the Invention

In view of the problems described above, an object of the present invention is to propose detailed tire configurations for providing a tire having excellent wear resistance performance, low rolling resistance and high durability of side portion's appearance.

Means for Solving the Problem

The inventor of the present invention has discovered that performances of a tire can be improved as desired by meticulously regulating the tire shape and that, in a case of shape designing, in particular, it is effective to individually regulate respective shapes of reinforcing structures as a framework of the tire, as well as the shape of the outer surface of the tire, because the shapes of reinforcing structures have significant influences on tire performances. Specifically, the inventor has discovered that suppressing shear deformation of a tire in a section in the tire width direction, in particular, shear deformation in a tread on the outer side in the width direction thereof results in simultaneous improvement of decrease in rolling resistance generated as a result of energy loss caused by this deformation and reduction of wear often generated by shearing force and slip also caused by the deformation.

The inventor has also discovered that it is possible to improve durability of side portion's appearance which is often seen in a tire having a flat belt by specifying a turn-up height of a carcass ply without decreasing the above-mentioned wear resistance performance and rolling resistance performance, thereby completing the present invention.

In addition, the inventor has discovered that it is possible to further improve durability of side portion's appearance by providing a carcass ply reinforcing layer and by specifying a height of a bead filler.

The subject matter of the present invention is as follows.

Figure 1:
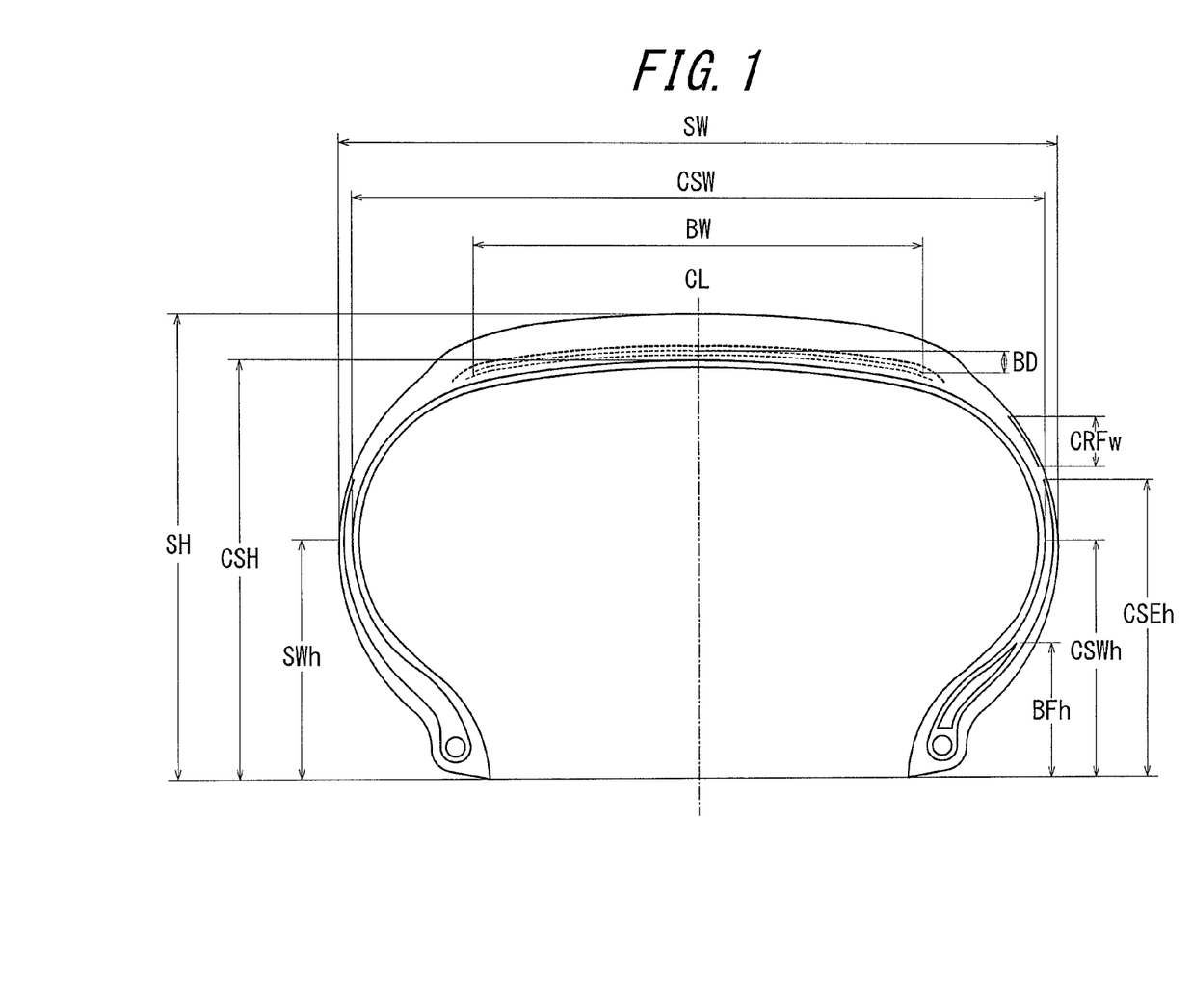
FIG. 1 shows a widthwise section of a tire to explain tire dimensions defined in the present invention.

FIG. 1 should be referred to the tire dimensions described below.

(1) A pneumatic tire comprising a carcass as a framework consisting of at least one carcass ply troidally extending between bead portions embedded with a pair of bead cores and turned around the bead cores from an inner side to an outer side in a tire width direction, a belt comprising at least one inclined belt layer and a tread successively disposed on a radially outer side of a crown portion of the carcass, wherein a ratio BD/BW is in a range between 0.01 and 0.04 in a section of the tire in the width direction in a state where the tire is mounted on an application rim, where BD is radius difference between radius at a central portion and radius at an end portion in the tire width direction of the outermost layer of the inclined belt layer and BW is a width of the outermost layer and CSEh is larger than SWh, where CSEh is a shortest distance from an end of a turn-up portion of the at least one carcass ply to a line drawn in parallel with a tire rotation axis at a bead toe and SWh is a shortest distance between a line drawn in parallel with the tire rotation axis at a maximum width position of the tire and the line drawn in parallel with the tire rotation axis at the bead toe.

In the present invention, a "state where a tire is mounted on an application rim" represents a state where a tire is mounted on a standard rim or an application rim of another type prescribed in Japan Automobile Tyre Manufacturers Association (JATMA) and the tire is inflated at no internal pressure or an extremely low internal pressure up to 30 kPa or so.

(2) The pneumatic tire according to the above item (1), further comprising a carcass ply reinforcing layer disposed on a widthwise outer side of the carcass at the maximum width position of the tire, wherein a ratio CRFw/CSH is in a range between 0.2 and 0.6, where CRFw is a width of the carcass ply reinforcing layer and CSH is a distance from a radially outermost side of the carcass to the line drawn in parallel with the tire rotation axis at the bead toe and an reinforcing element embedded in the carcass ply reinforcing layer is inclined at an angle of 30° to 90° with respect to a tire equatorial plane.

(3) The pneumatic tire according to the above item (1) or (2), wherein a ratio BFh/CSH is in a range between 0.04 and 0.40, where BFh is a height of a bead filler and CSH is a distance from a radially outermost side of the carcass to the line drawn in parallel with the tire rotation axis at the bead toe.

(4) The pneumatic tire according to any one of the above items (1) to (3), wherein a ratio CSWh/CSH is in a range between 0.6 and 0.9, where CSWh is a shortest distance between a line drawn in parallel with the tire rotation axis at the maximum width position of the carcass and the line drawn in parallel with the tire rotation axis at the bead toe and CSH is a distance from a radially outermost side of the carcass to the line drawn in parallel with the tire rotation axis at the bead toe.

(5) The pneumatic tire according to any one of the above items (1) to (4), wherein a ratio SWh/SH of the shortest distance SWH to a section height SH of the tire is in a range between 0.5 and 0.8.

BEST MODE FOR CARRYING OUT THE INVENTION

Hereinafter, the present invention will be specifically explained with reference to drawings.

First Embodiment

Figure 2:
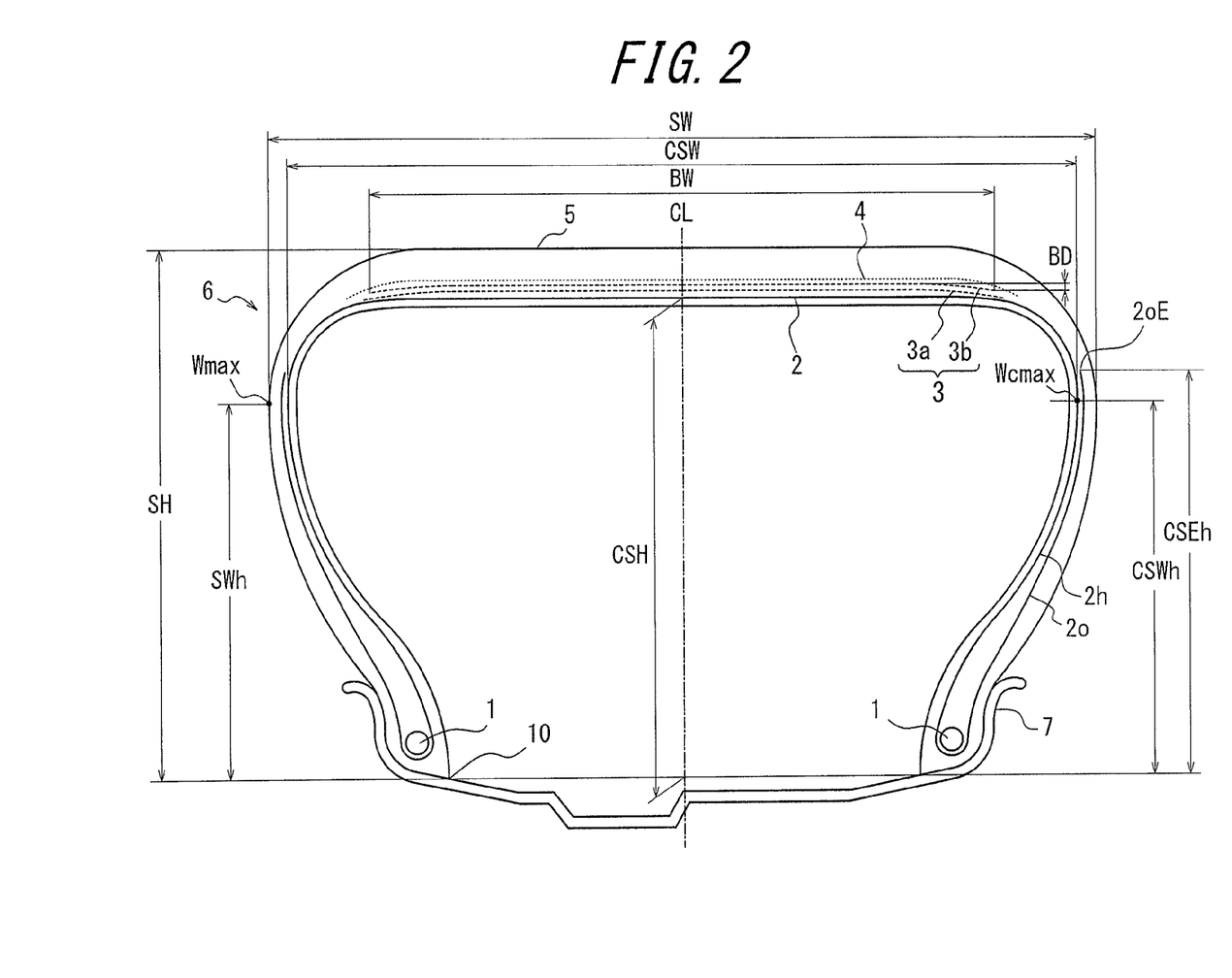
FIG. 2 shows a widthwise section of a pneumatic tire according to the first embodiment of the present invention.

FIG. 2 shows a widthwise section of a pneumatic tire (hereinafter, referred to as a tire) according to the first embodiment of the present invention. A tire 6 of the present invention comprises a carcass 2 as a framework consisting of at least one carcass ply (one carcass ply in this figure) troidally extending between bead portions embedded with a pair of bead cores 1 and turned around the bead cores 1 from an inner side to an outer side in the tire width direction, a belt comprising at least one inclined belt layer (two inclined belt layers 3a, 3b in this figure) and one circumferential belt layer 4 disposed on a radially outer side of a crown portion of the carcass 2 and a tread 5 disposed on the radially outer side of the belt. The two inclined belt layers 3a, 3b are formed by coating a number of cords extending in a direction inclined with respect to a tire equatorial plane CL with rubber, and the circumferential belt layer 4 is formed by coating a number of cords extending along the tire equatorial plane CL with rubber.

Only one inclined belt layer may be disposed but in this case, it is preferable that the inclined belt layer is disposed together with at least one circumferential belt layer to form a belt.

Such a tire 6 is mounted on an application rim 7 and served for use. A ratio BD/BW is in a range between 0.01 and 0.04 in a section of the tire 6 in the width direction in a state where the tire 6 is mounted on the application rim 7, where BD is radius difference between radius at a central portion (tire equatorial plane CL) and radius at an end portion in the tire width direction of the outermost layer 3b of the inclined belt layers and BW is a width of the outermost layer 3b.

In the present embodiment, the inclined belt layer has a width which is equal to or more than 0.6 times as much as the maximum width CSW of a body portion 2h of the carcass 2.

Figure 3:
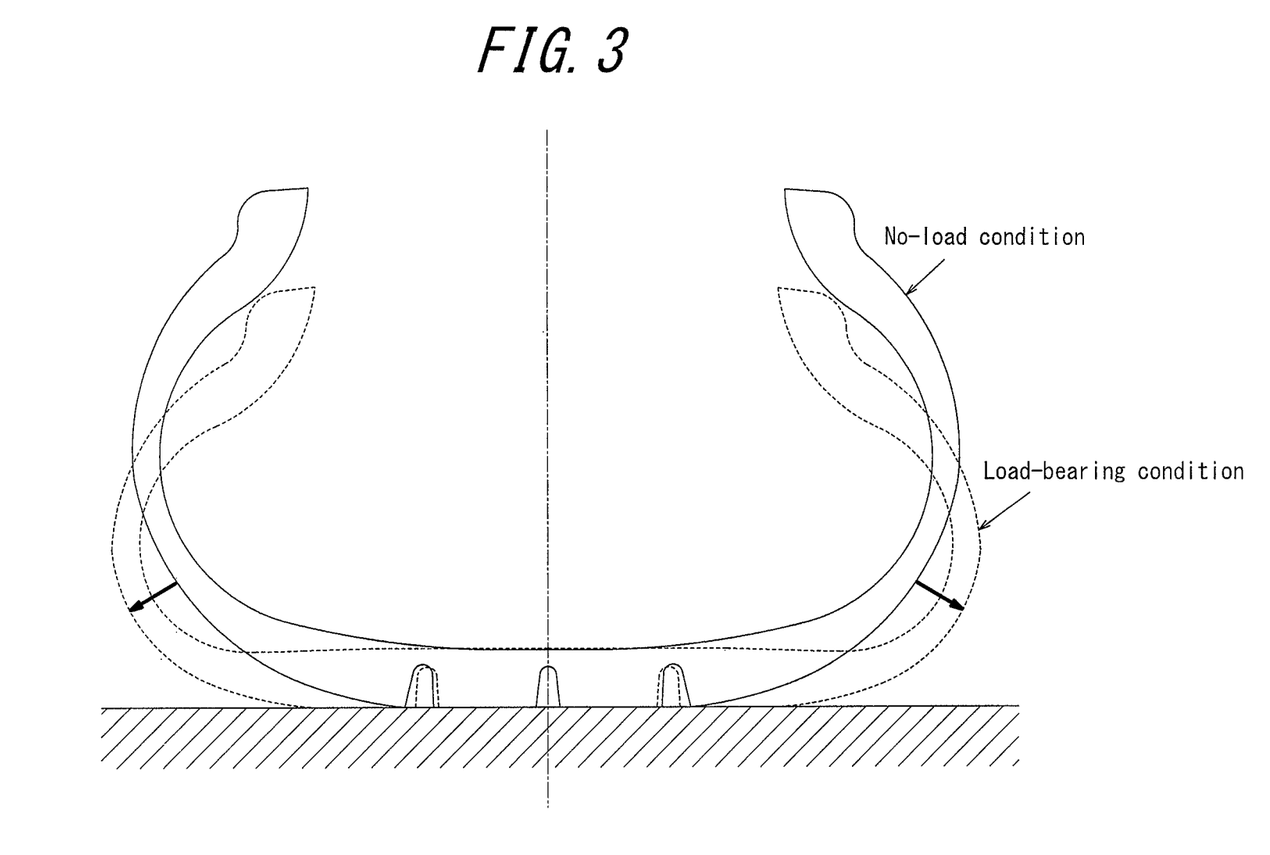
FIG. 3 is a view showing behaviors before and after application of load to a conventional tire.

The aforementioned ratio restriction means that there exists relatively small difference in radius, in the width direction, of the inclined belt layer. In other words, this restriction indicates that the belt is close to a state where it is flat. As described above, rolling resistance is primarily due to energy loss occurring in rubber of a tire tread portion and therefore suppressing shear deformation in a section in the width direction, which shear deformation is one example of relevant deformation, is effective for decreasing rolling resistance. Such shear deformation as described above occurs mostly due to significant deformation between before and after application of load, which deformation is indicated in FIG. 3 by arrows, with solid lines representing a no-load state of a radial tire of size 195/65R15 (BD/BW ratio: 0.052) prior to the tire being inflated by an internal pressure and dotted lines representing a state where load of 4.41 kN is applied after the tire is inflated at an internal pressure of 210 kPa. Note that the shear deformation is deformation in which a curved belt is stretched flat at the ground contact portion thereof. Further, as shown in FIG. 3, a standard radial tire has a smaller radius at a shoulder portion thereof than the tire center portion, resulting in radius difference between the two portions, whereby the belt in the vicinity of the shoulder portion is stretched along the tire circumferential direction. As a result, the inclined belt layers formed by cords intersecting each other are deformed like a pantograph to extend in the circumferential direction and to shrink in the width direction, thereby facilitating the aforementioned shear deformation and increasing hysteresis loss of tread rubber.

Figure 4:
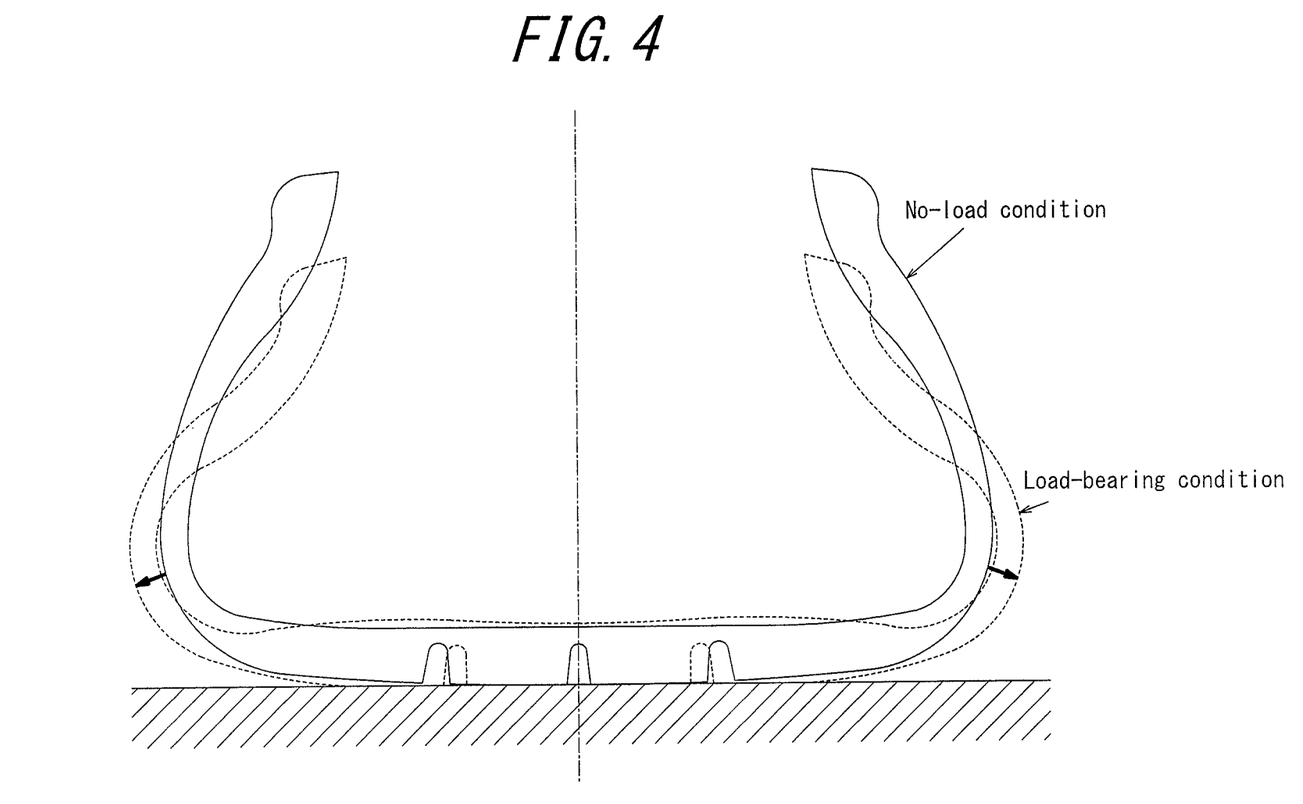
FIG. 4 is a view showing behaviors before and after application of load to a pneumatic tire of the present invention.

In order to suppress this shear deformation in a configuration surface of a tire in the easiest and simplest manner, it is necessary to design a belt as flat as possible. Specifically, by making a belt of a tire having the same size as the tire of FIG. 3 significantly flat (BD/BW ratio: 0.026) and setting deformation of the tire between before and after application of load under the same condition as those in FIG. 3 such that BD/BW is no larger than 0.04 as shown in FIG. 4, deformation between before and after application of load (see arrows in FIG. 4) can be suppressed at a very low level. Accordingly, hysteresis loss of tread rubber is decreased and a tire having relatively low rolling resistance can be obtained by setting the ratio BD/BW thereof not to be larger than 0.04.

Further, it has been revealed that, in a case where the aforementioned modification of suppressing shear deformation is carried out, shearing force and distribution of tread slip within a ground contact surface change such that magnitudes thereof are reduced in terms of the tread configuration, whereby wear resistance performance of the tire can be improved, as well.

In actual designing of a tire, it is important that the tire is not made completely flat but curvedness thereof is set within an appropriate range in view of a deformation component associated with deformation of a side portion, also in view of a ground contact configuration and the distribution of ground contact pressure required for preventing uneven wear from occurring. As a result of keen study of the appropriate range of the aforementioned curvedness, it has been revealed that the ratio BD/BW is required to be not less than 0.01.

Furthermore, in FIG. 2, it is important that CSEh is larger than SWh, where CSEh is the shortest distance (hereinafter, also referred to as a turn-up height) from an end $2oE$ of a turn-up portion $2o$ of the carcass ply to a line drawn in parallel with the tire rotation axis at a bead toe 10 and SWh is the shortest distance (hereinafter, also referred to as a height at the maximum width position) between a line drawn in parallel with the tire rotation axis at a maximum width position Wmax of the tire and the line drawn in parallel with the tire rotation axis at the bead toe 10. The reason for this will be described as follows.

As mentioned above, when a tire with a nearly flat belt bends under load, the crown portion including the belt hardly bends and bending due to flexure is easily concentrated on the side portion, especially on the maximum width position Wmax of the tire. Therefore, there is a problem in the tire appearance that cracks occur in the outer surface of the maximum width position Wmax.

In order to restrain clacks of the outer surface of the side portion, in other words, to restrain strain of the outer surface of the side portion, one possible way is to increase bending rigidity of the side portion thereby restraining flexure of the side portion. However, since bending due to flexure is concentrated on the side portion to reduce deformation of the tread portion and to reduce energy loss of the tread portion as mentioned above, it is required to reduce outer surface strain in the side portion while keeping flexure in the side portion large. The inventor has tried various ways to reduce outer surface strain in the side portion while keeping flexure in the side portion large and found it possible to restrain outer surface strain in the side portion by setting the turn-up height CSEh from the bead portion of the carcass ply higher than the height at the maximum width position SWh. In the maximum width position Wmax of the tire on which bending of the side portion is concentrated, the turn-up portion $2o$ of the carcass ply is put on the body portion $2h$ of the carcass ply to form double layers so that the neutral axis of bending in this portion is displaced to the outer surface side. As a result, strain of the outer surface can be restrained.

Figure 5:
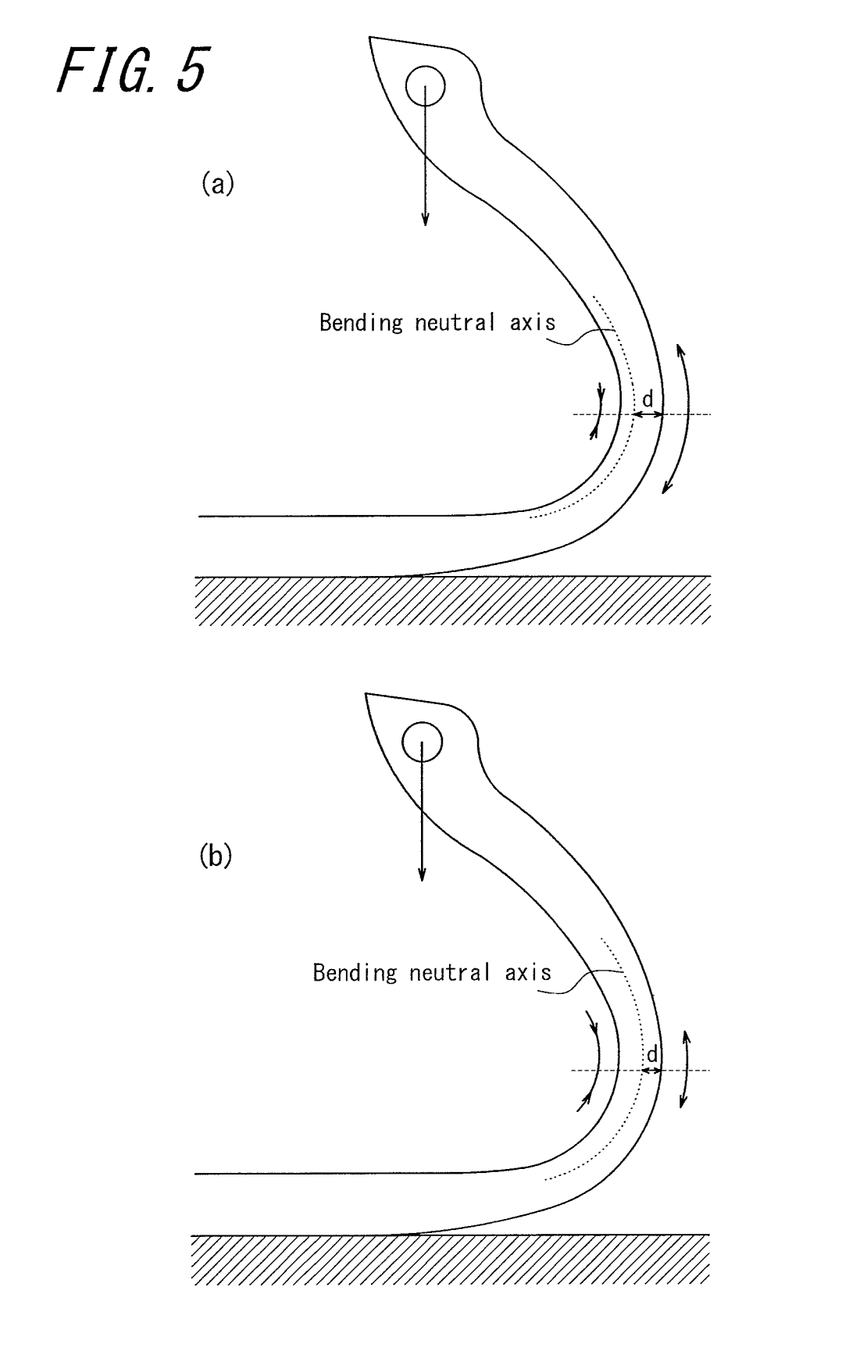
FIG. 5 is a view showing tensile strain when a bending neutral axis is changed.

With reference to FIG. 5, the inside of the neutral axis of bending is subject to compression stress while the outside is subject to tensile stress. Rubber has high rigidity with respect to compression stress but low rigidity with respect to tensile stress. Therefore, when as shown in FIG. 5 (a), the distance d from the neutral axis of bending to the surface of the side portion is large, tensile strain acting on the outside of the neutral axial of bending becomes large so that cracks are easy to occur in this portion. Therefore, when as shown in FIG. 5 (b), the distance d from the neutral axis of bending to the surface of the side portion is set small, tensile strain acting on the outside of the neutral axial of bending becomes small so that cracks are hard to occur in this portion.

According to the present invention, by setting the turn-up height CSEh from the bead portion of the carcass ply higher than the height at the maximum width position SWh, two carcass plies are disposed at the maximum width position Wmax of the tire on which bending of the side portion is concentrated, to displace the neutral axis of bending to the outer surface side so that strain of the outer surface of the side portion can be restrained.

It is noted that only the turn-up height CSEh of the carcass ply is changed, which does not make a large influence on flexure of the whole tire.

It is important that the ratio CSEh/SWh of the turn-up height CSE to the height at the maximum width position SWh is larger than 1 and it is preferable that the ratio is in a range between 1.02 and 2.0. In addition, it is more preferable that the ratio is in a range between 1.02 and 1.25.

In the case where the ratio CSEh/SWh is 1, in other words, in the case where the end $2oE$ of the turn-up portion $2o$ of the carcass ply exists at the maximum width position Wmax, the end $2oE$ is disposed at the center of bending and therefore, it is likely that cracks may occur since this end $2oE$ becomes a starting point. Therefore, it is important for the ratio CSEh/SWh to be larger than 1.

The lower limit of the preferred range of the ratio CSEh/SWh is set to 1.02, whereby the turn-up height CSEh surely exceeds the height SWh at the maximum width position even if the turn-up height CSEh may vary slightly due to production error.

On the other hand, the upper limit of the preferred range of the ratio CSEh/SWh is set to 2.0 since the effect to restrain surface strain is not improved even if the turn-up height CSEh largely exceeds the height at the maximum width position SWh. In the case of most tires, when the ratio exceeds 2.0, the positional relationship that the end $2oE$ of the turn-up portion $2o$ of the carcass ply exceeds the belt edge is established. In addition, in the case where the turn-up portion $2o$ is excessively large, which may also make an influence on flexure and cause degradation of ride comfort due to longitudinal spring increase.

According to examples to be described below, it is confirmed that the advantage of the present invention can be sufficiently obtained when the ratio CSEh/SWh is 1.25.

Next, as shown in FIG. 2, it is preferable that the ratio CSWh/CSH is in a range between 0.6 and 0.9, where CSWh is the shortest distance between a line drawn in parallel with the tire rotation axis at the maximum width position Wcmax of the body portion $2h$ of the carcass 2 and the line drawn in parallel with the tire rotation axis at the bead toe 10 and CSH is a distance from a radially outermost side of the carcass 2 to the line drawn in parallel with the tire rotation axis at the bead toe 10. It is more preferable that the ratio CSWh/CSH is in a range between 0.7 and 0.8.

According to this feature, particularly, the carcass line of the tire side portion bends locally in the vicinity of a road surface, and bending rigidity is small in this region. As a result, the portion around this bent region, which is located on the widthwise outer side of the belt width, is largely deformed under load so that a magnitude of deformation in the tread portion is decreased. In other words, a magnitude of shear deformation in the above-mentioned section can be decreased in the tread. After testing various dimensions to effectively reduce deformation when load is applied on a tire, it has been revealed that the ratio CSWh/CSH is required to be in a range between 0.6 and 0.9.

In addition, as shown in FIG. 2, it is preferable that the ratio SWh/SH of the height SWh at the maximum width position to the section height SH of the tire is in a range between 0.5 and 0.8.

It is more preferable that the ration SWh/SH is in a range between 0.6 and 0.75.

Regarding a shape of a side portion, it is primarily important to regulate the shape by a carcass line as a framework. However, the side portion cannot be excluded from consideration of the phenomenon that energy loss occurring inside rubber contributes to rolling resistance. That is, modifying a side portion such that the side portion conforms to a carcass line to have a different shape from that of a conventional tire would result in efficient improvement of a tire. This means, for example, making side rubber relatively thin. If side rubber were to be completely eliminated, the dimension of a side portion would obviously coincide with the maximum width position of the carcass line. In actual practice, however, side rubber must have a predetermined thickness in order to protect the carcass upon contact with curbstones and for other purposes. In view of the situation described above, a height of the side portion at the tire maximum width position relative to the sectional height of the tire was adjusted, whereby it was confirmed that the ratio SWh/SH should be within the aforementioned range. Since designing of a vulcanization mold is critically important in tire designing, it is necessary in terms of a tire designing method to define the modifications in the present invention as dimensions of the outer surfaces of a tire.

Next, with reference to FIGS. 6 and 7, modified examples of a tire according the first embodiment of the present invention will be explained.

Figure 6:
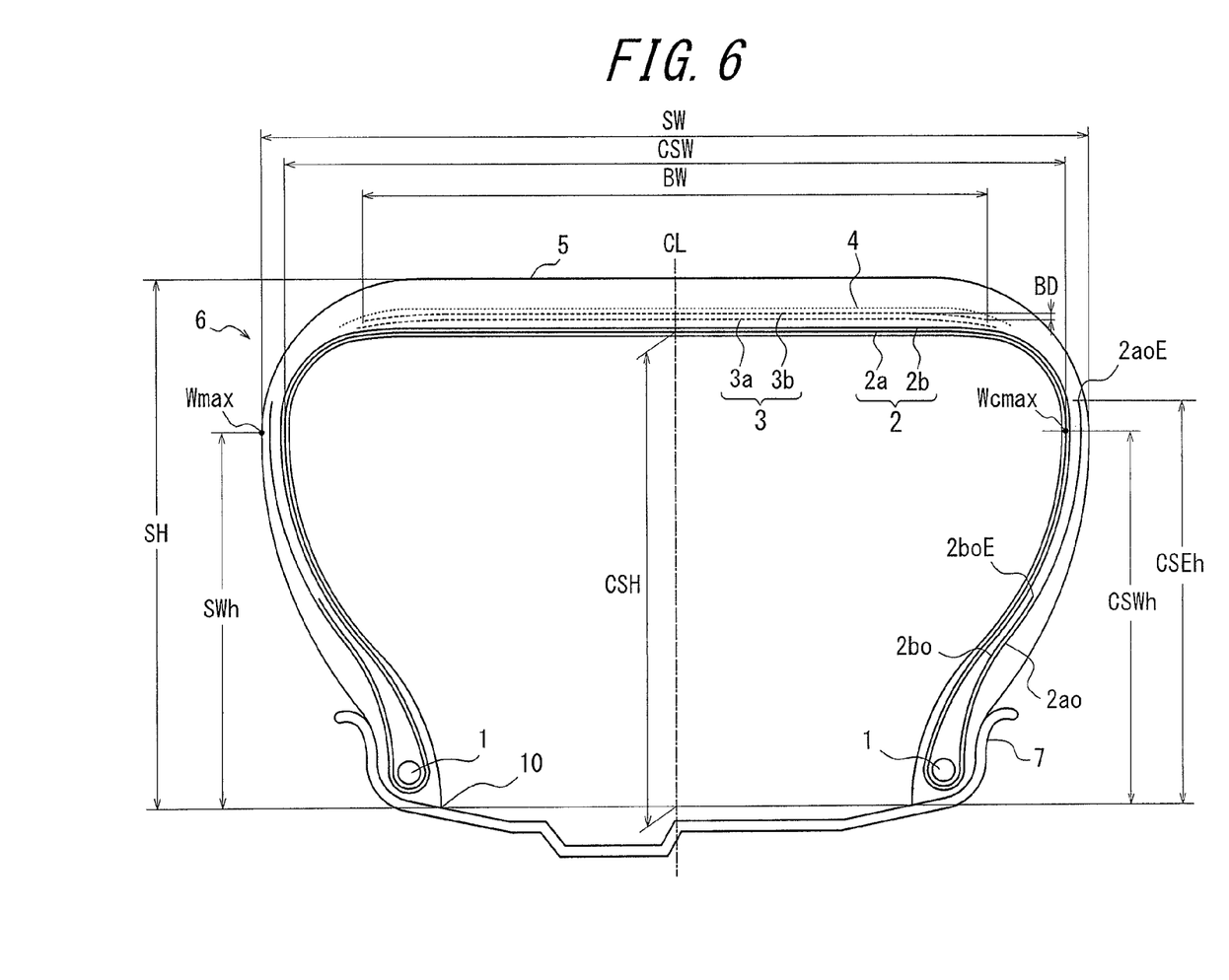
FIG. 6 shows a widthwise section of a pneumatic tire according to the first embodiment of the present invention.

In FIG. 6, the carcass 2 consists of two carcass plies 2a, 2b and the turn-up height CSEh of the carcass ply 2a disposed on the radially innermost side is larger than the height SWh at the maximum width position.

Figure 7:
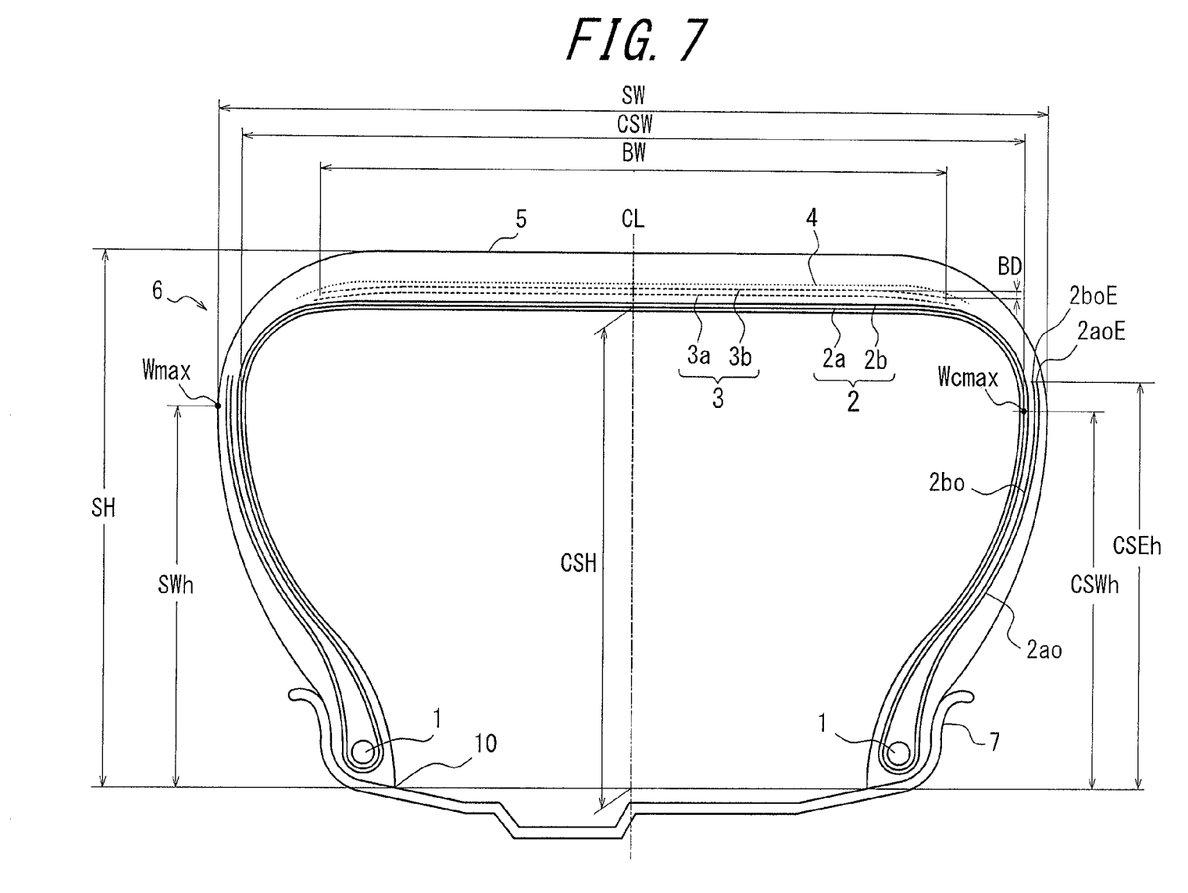
FIG. 7 shows a widthwise section of a pneumatic tire according to the first embodiment of the present invention.

In FIG. 7, the carcass 2 consists of two carcass plies 2a, 2b and the turn-up height CSEh of both of the carcass plies 2a, 2b is larger than the height SWh at the maximum width position.

As shown in FIGS. 6 and 7, in the case where the carcass 2 consists of two carcass plies 2a, 2b, the turn-up height CSEh of the innermost carcass ply 2a is larger than the height SWh at the maximum width position, three or more carcass plies are disposed at the maximum width position Wmax of the tire and the neutral axis of bending in this portion is displaced to the outer surface side to restrain strain of the outer surface of the side portion.

As shown in FIGS. 6 and 7, in the case where the carcass 2 consists of two carcass plies 2a, 2b, it is preferable that the ratio CSWh/CSH is in a range between 0.6 and 0.9, where CSWh is the shortest distance between a line drawn in parallel with the tire rotation axis at the maximum width position Wcmax of the body portion of the carcass ply 2a disposed in the innermost side and the line drawn in parallel with the tire rotation axis at the bead toe 10 and CSH is a distance from a radially outermost side of the carcass ply 2a to the line drawn in parallel with the tire rotation axis at the bead toe 10.

Second Embodiment

Figure 8:
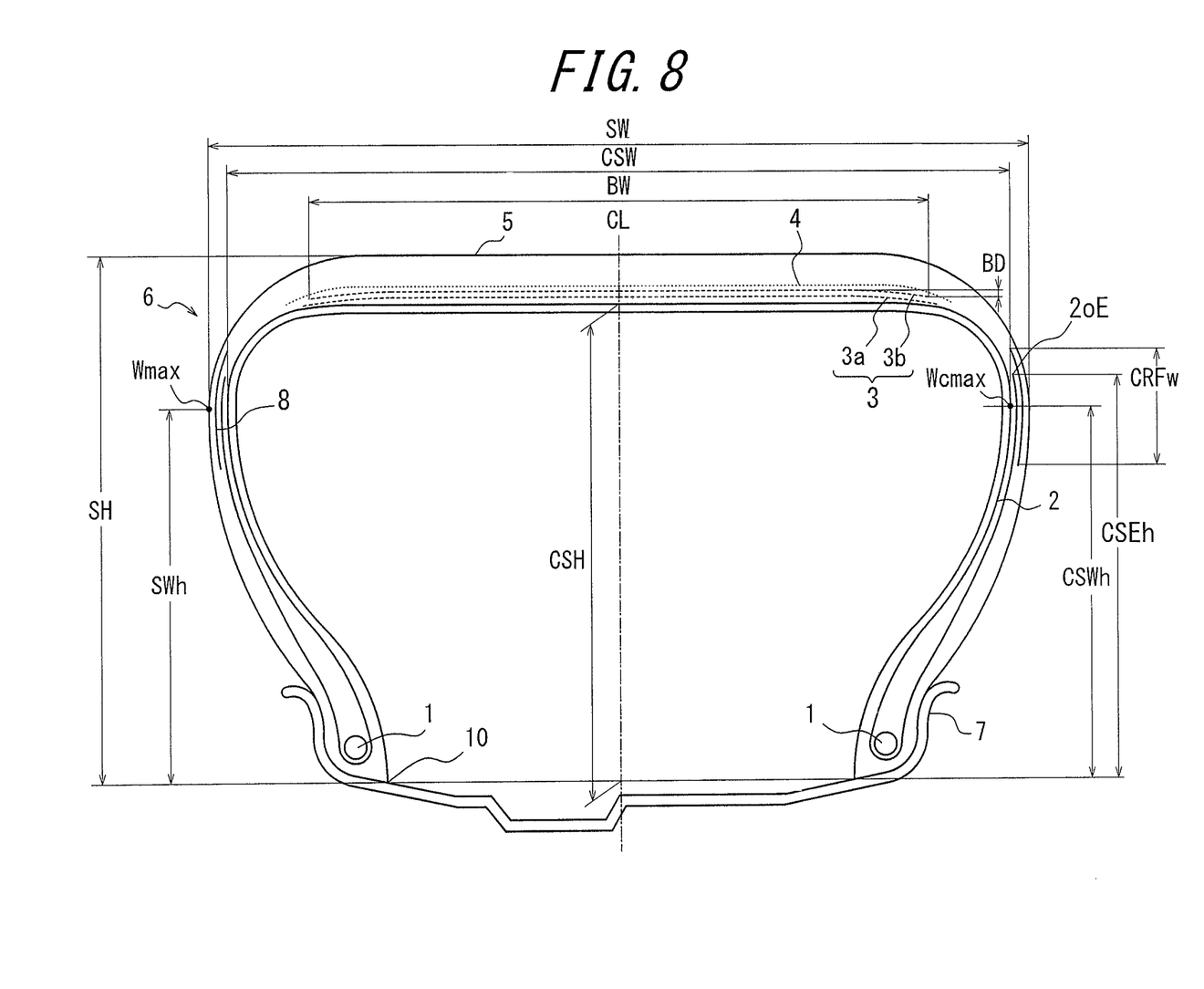
FIG. 8 shows a widthwise section of a pneumatic tire according to the second embodiment of the present invention.

FIG. 8 shows a widthwise section of a pneumatic tire according to the second embodiment of the present invention. As shown in FIG. 8, a carcass ply reinforcing layer 8 is disposed on a widthwise outer side of the carcass 2 at the maximum width position Wmax of the tire to cover the maximum width position Wmax of the tire. The ratio CRFw/CSH is in a range between 0.2 and 0.6, where CRFw is a width of the carcass ply reinforcing layer 8 and CSH is a distance from a radially outermost side of the carcass 2 to the line drawn in parallel with the tire rotation axis at the bead toe 10 and an reinforcing element embedded in the carcass ply reinforcing layer 8 is inclined at an angle of 30° to 90° with respect to the tire equatorial plane CL.

Although the carcass ply reinforcing layer 8 is disposed on the widthwise outer side of the turn-up portion 2o of the carcass ply in FIG. 8, the carcass ply reinforcing layer 8 may be disposed between the turn-up portion 2o and the body portion 2h of the carcass ply.

The turn-up portion 2o of the carcass ply is disposed on the body portion 2h of the carcass ply and the carcass ply reinforcing layer 8 is disposed at the maximum width position Wmax of the tire on which bending of the side portion is concentrated, thereby displacing the neutral axis of bending to the outer surface side in this position. As a result, strain of the outer surface can be restrained.

It is preferable that the ratio CRFw/CSH is in a range between 0.2 and 0.6, where CRFw is a width of the carcass ply reinforcing layer 8 and CSH is a distance from a radially outermost side of the carcass 2 to the line drawn in parallel with the tire rotation axis at the bead toe 10.

When the ratio CRFw/CSH is less than 0.2, the width CRFw of the carcass ply reinforcing layer 8 is too narrow to act as a reinforcing layer. On the other hand, when the ratio CRFw/CSH is more than 0.6, the width CRFw of the carcass ply reinforcing layer 8 is too wide and in most cases, the positional relationship is established that the carcass ply reinforcing layer 8 is overlapped with any of the inclined belt layers 3a, 3b and the circumferential belt layer 4, which may make an influence on flexure and cause degradation of ride comfort due to longitudinal spring increase.

In addition, it is preferable that carcass ply reinforcing layer 8 is disposed in such a manner that the radially central position of the carcass ply reinforcing layer 8 exists at the position which generally agrees with the maximum width position Wmax of the tire.

In addition, the reinforcing element embedded in the carcass ply reinforcing layer 8 is inclined at an angle of 30° to 90° with respect to the tire equatorial plane CL.

In the case where the inclination angle of the reinforcing element is less than 30°, the reinforcing element may make an influence on flexure of the tire and cause degradation of ride comfort due to longitudinal spring increase.

In addition, it is preferable that the reinforcing element is made of material having the similar elasticity to that of the element embedded in the carcass 2. It is because a member having high elasticity like a steel cord may make an influence on flexure and cause degradation of ride comfort due to longitudinal spring increase.

Third Embodiment

Figure 9:
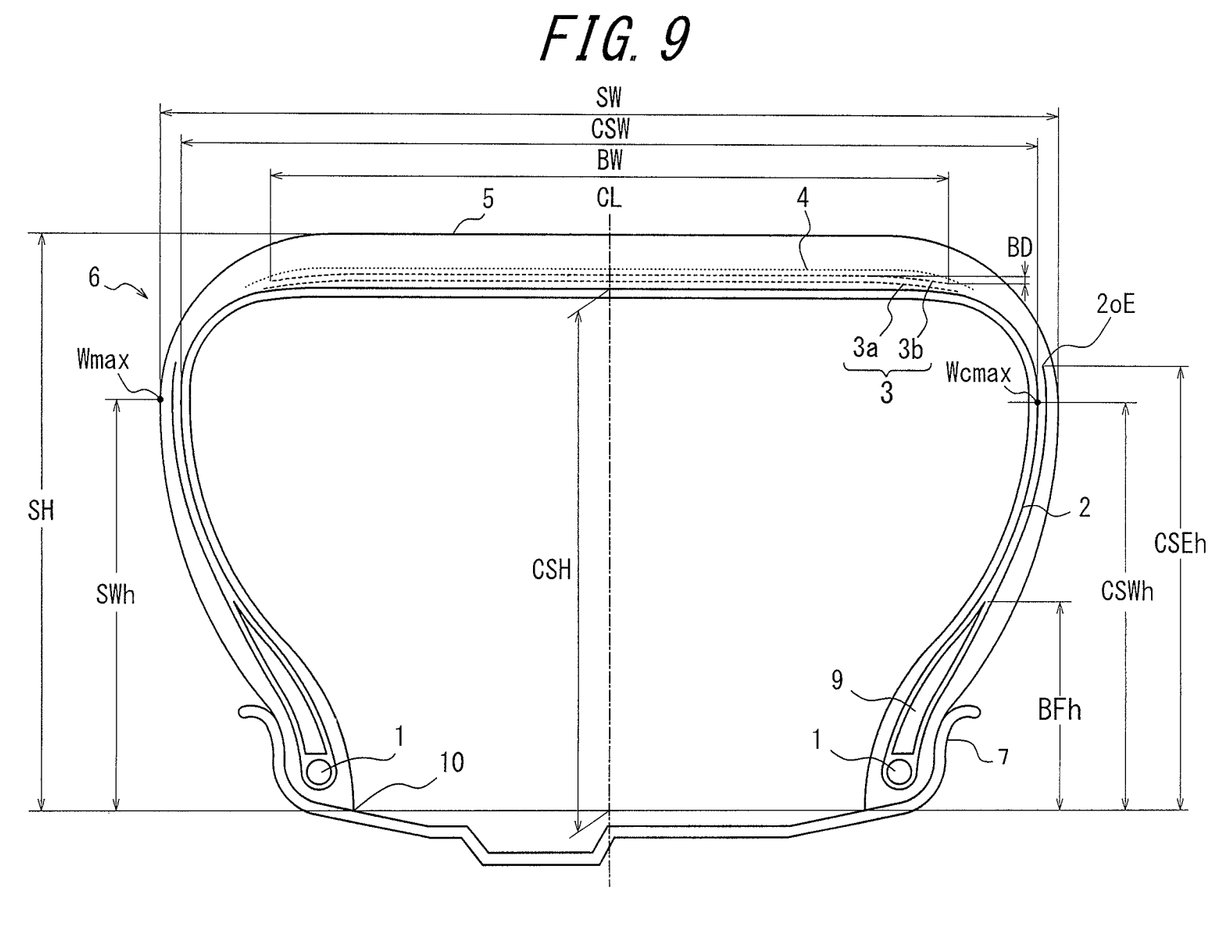
FIG. 9 shows a widthwise section of a pneumatic tire according to the third embodiment of the present invention.

FIG. 9 shows a widthwise section of a pneumatic tire according to the third embodiment of the present invention. As shown in FIG. 9, the ratio BFh/CSH is in a range between 0.04 and 0.40, where BFh is the height of a bead filler 9 and CSH is a distance from a radially outermost side of the carcass 2 to the line drawn in parallel with the tire rotation axis at the bead toe 10. The height BFh of the bead filler 9 means a distance from a radially outermost side of the bead filler 9 to the line drawn in parallel with the tire rotation axis at the bead toe 10.

The turn-up portion 2o of the carcass ply is overlapped with the body portion 2h of the carcass ply at the maximum width position Wmax of the tire on which bending of the side portion is concentrated to reinforce this position and the bead filler 9 is set small so that the bending deformation is applied to the whole side portion under load and therefore, the bending deformation can be prevented from being concentrated on the maximum width position Wmax of the tire. As a result, strain of the outer surface at the maximum width position Wmax can be restrained.

The lower limit of the ratio BFh/CSH is set to 0.04 because it is difficult to produce smaller bead fillers. On the other hand, the upper limit of the ratio BFh/CSH is set to 0.40 because of examples mentioned below.

In addition, by making the bead filler 9 small, the tire weight can be reduced, which further contributes to a fuel-efficient car.

EXAMPLE

Conventional Example tire, Example tires and Comparative Example tires having the size of 195/65R15 with the specifications shown in Tables 1-1 to 1-3 are experimentally produced and each test tire is subjected to durability examination of cracks in the side portion, rolling resistance examination and abrasion resistance examination.

Figure 10:
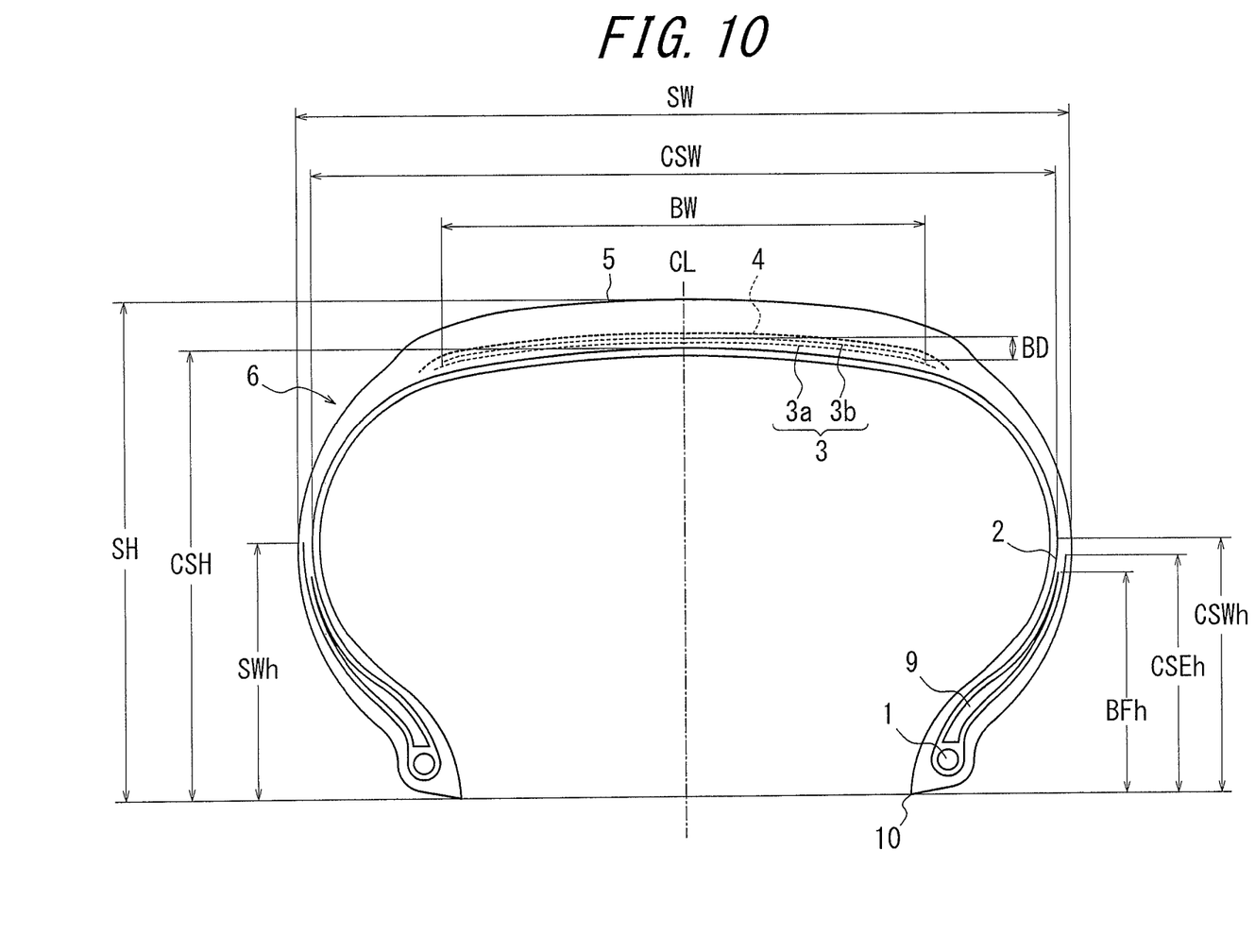
FIG. 10 shows a widthwise section of a conventional tire.

Conventional Example tire has the tire shape and configuration shown in FIG. 10.

All of Example tires 1-1 to 1-9 and Comparative Example tires 1-1 and 1-2 have the same tire shape and configuration shown in FIG. 2 but have varied height CSEh of the turn-up portion of the carcass ply and height SWh at the maximum width position. The thickness from the inner surface to the outer surface at the tire maximum width position Wmax is the approximately same.

All of Example tires 2-1 to 2-12 have the same tire shape and configuration shown in FIG. 8 but have varied width CRFw of the carcass ply reinforcing layer 8 and inclination angle of the reinforcing element.

All of Example tires 3-1 to 3-11 have the same tire shape and configuration shown in FIG. 9 but have varied height BFh of the bead filler 9.

(Durability Examination of Cracks in the Side Portion)

Durability examination of cracks in the side portion is performed in such a manner that each test tire is mounted on a normal rim and inflated with an internal pressure of 210 kPa and then a running distance is measured under the load condition of 2.5 times of the regular load (the condition to promote cracks in the side portion) using a drum examination machine having an iron plate surface whose diameter is 1.7 m (speed: 80.0 km/h) until cracks are generated in the side portion. The measurement result is indexed with the running distance of Example tire 1-1 being defined as 100 and the larger value means the fewer cracks. It is noted that the value of not less than 85 is within the allowable range since is possible to keep the marketability.

(Rolling Resistance Examination)

Rolling resistance examination is performed in such a manner that each test tire is mounted on a normal rim and inflated with an internal pressure of 210 kPa and then a rolling resistance force of an axle is measured using a drum examination machine having an iron plate surface whose diameter is 1.7 m (speed: 80.0 km/h). The measurement of this rolling resistance is performed in smooth drum and forth way according to ISO18164. The measurement result shown in Tables 1-1 to 1-3 is indexed with rolling resistance of Conventional Example tire being defined as 100 and the smaller value means the smaller rolling resistance.

(Longitudinal Spring Performance Examination)

Longitudinal spring performance is calculated in such a manner that the flexure amount is measured in the case of the rolling resistance examination and "load/bending amount" is indexed with the value of Example tire 1-1 being defined as 100. The larger value means the smaller flexure amount. In other words, the smaller value means the better ride comfort due to easy flexure. The flexure amount is calculated by subtracting the tire axis height under load from the tire axis height under no load.

(Abrasion Resistance Examination)

Abrasion resistance examination is performed in such a manner that each test tire is mounted on a normal rim and inflated with an internal pressure of 210 kPa under the same load condition as that of the rolling resistance examination using an indoor drum examination machine having an surface whose diameter is 1.7 m (speed: 80.0 km/h) with a safety walk. The input of fee rolling for 10 minutes and the input of 0.1 G in a braking direction are repeated. The abrasion weight (the amount of abraded rubber) after 1,200 km run under this condition is measured. The measurement result shown in Tables 1-1 to 1-3 is indexed with the abrasion weight of Conventional Example tire being defined as 100. The smaller abrasion weight means the better result. Difference less than 5% means the equal and 10% or more difference means remarkable difference.

In this examination, implication of abrasion resistance examination is large because the weight of abraded rubber is compared. However, the detection is possible also in this examination because a tire having bad uneven wear performance is early abraded. In other words, this viewpoint includes both sides of uneven wear resistance and abrasion resistance.

TABLE 1-1

| | BD/BW | SWh [mm] | CSEh [mm] | CSEh/ SWh | CSH [mm] | BFh [mm] | BFh/ CSH | CSWh/ CSH | SWh/ SH | Durability performance of side crack | Longitudinal spring performance | Rolling resistance performance | Wear resistance performance |
|---|---|---|---|---|---|---|---|---|---|---|---|---|---|
| Conventional Example | 0.052 | 63 | 60 | 0.95 | 114 | 45 | 0.39 | 0.544 | 0.496 | — | — | 100 | 100 |
| Example 1-1 | 0.026 | 75 | 78 | 1.04 | 114 | 45 | 0.39 | 0.605 | 0.512 | 100 | 100.0 | 80 | 85 |
| Example 1-2 | 0.026 | 75 | 86 | 1.15 | 114 | 45 | 0.39 | 0.605 | 0.512 | 100 | 100.5 | 80 | 85 |
| Example 1-3 | 0.026 | 75 | 94 | 1.25 | 114 | 45 | 0.39 | 0.605 | 0.512 | 106 | 101.5 | 80 | 85 |
| Example 1-4 | 0.026 | 75 | 102 | 1.36 | 114 | 45 | 0.39 | 0.605 | 0.512 | 106 | 104.1 | 82 | 86 |
| Example 1-5 | 0.026 | 83 | 86.5 | 1.04 | 114 | 45 | 0.39 | 0.746 | 0.654 | 100 | 100.5 | 78 | 84 |
| Example 1-6 | 0.026 | 96 | 100 | 1.04 | 114 | 45 | 0.39 | 0.860 | 0.758 | 100 | 101.0 | 84 | 88 |
| Example 1-7 | 0.026 | 63 | 65.5 | 1.04 | 114 | 45 | 0.39 | 0.544 | 0.496 | 100 | 100.5 | 82 | 86 |
| Example 1-8 | 0.026 | 100 | 104 | 1.04 | 114 | 45 | 0.39 | 0.904 | 0.787 | 100 | 101.5 | 87 | 92 |
| Example 1-9 | 0.026 | 103 | 107 | 1.04 | 114 | 45 | 0.39 | 0.934 | 0.811 | 100 | 102.0 | 89 | 94 |

TABLE 1-1-continued

|  | BD/BW | SWh [mm] | CSEh [mm] | CSEh/ SWh | CSH [mm] | BFh [mm] | BFh/ CSH | CSWh/ CSH | SWh/ SH | Durability performance of side crack | Longitudinal spring performance | Rolling resistance performance | Wear resistance performance |
|---|---|---|---|---|---|---|---|---|---|---|---|---|---|
| Comparative Example 1-1 | 0.026 | 75 | 70 | 0.90 | 114 | 45 | 0.39 | 0.605 | 0.512 | 83 | 99.5 | 80 | 85 |
| Comparative Example 1-2 | 0.026 | 75 | 62 | 0.83 | 114 | 45 | 0.39 | 0.605 | 0.512 | 79 | 99.0 | 80 | 85 |

TABLE 1-2

|  | BD/BW | SWh [mm] | CSEh [mm] | CSEh/ SWh | CSH [mm] | CRFw [mm] | CRFw/ CSH | Angle (*1) [°] | BFh [mm] | BFh/ CSH | CSWh/ CSH | SWh/ SH | Durability performance of side crack | Longitudinal spring performance | Rolling resistance performance | Wear resistance performance |
|---|---|---|---|---|---|---|---|---|---|---|---|---|---|---|---|---|
| Example 2-1 | 0.026 | 75 | 78 | 1.04 | 114 | 23 | 0.20 | 90.0 | 45 | 0.39 | 0.605 | 0.512 | 100 | 100.0 | 80 | 85 |
| Example 2-2 | 0.026 | 75 | 78 | 1.04 | 114 | 46 | 0.40 | 90.0 | 45 | 0.39 | 0.605 | 0.512 | 106 | 101.1 | 80 | 85 |
| Example 2-3 | 0.026 | 75 | 78 | 1.04 | 114 | 68 | 0.60 | 90.0 | 45 | 0.39 | 0.605 | 0.512 | 108 | 102.3 | 81 | 86 |
| Example 2-4 | 0.026 | 75 | 78 | 1.04 | 114 | 46 | 0.40 | 60.0 | 45 | 0.39 | 0.605 | 0.512 | 107 | 102.5 | 81 | 86 |
| Example 2-5 | 0.026 | 75 | 78 | 1.04 | 114 | 46 | 0.40 | 30.0 | 45 | 0.39 | 0.605 | 0.512 | 107 | 104.5 | 82 | 87 |
| Example 2-6 | 0.026 | 75 | 78 | 1.04 | 114 | 23 | 0.20 | 90.0 | 45 | 0.39 | 0.746 | 0.654 | 100 | 100.5 | 78 | 84 |
| Example 2-7 | 0.026 | 75 | 78 | 1.04 | 114 | 23 | 0.20 | 90.0 | 45 | 0.39 | 0.860 | 0.758 | 100 | 101.1 | 84 | 88 |
| Example 2-8 | 0.026 | 75 | 78 | 1.04 | 114 | 23 | 0.20 | 90.0 | 45 | 0.39 | 0.544 | 0.496 | 100 | 100.5 | 82 | 86 |
| Example 2-9 | 0.026 | 75 | 78 | 1.04 | 114 | 23 | 0.20 | 90.0 | 45 | 0.39 | 0.904 | 0.787 | 100 | 101.5 | 87 | 92 |
| Example 2-10 | 0.026 | 75 | 78 | 1.04 | 114 | 11 | 0.10 | 90.0 | 45 | 0.39 | 0.605 | 0.512 | 92 | 100.0 | 80 | 85 |
| Example 2-11 | 0.026 | 75 | 78 | 1.04 | 114 | 80 | 0.70 | 90.0 | 45 | 0.39 | 0.605 | 0.512 | 107 | 109.2 | 84 | 88 |
| Example 2-12 | 0.026 | 75 | 78 | 1.04 | 114 | 46 | 0.40 | 20.0 | 45 | 0.39 | 0.605 | 0.512 | 107 | 110.1 | 84 | 88 |

(*1) Angle of reinforcing element

TABLE 1-3

|  | BD/BW | SWh [mm] | CSEh [mm] | CSEh/ SWh | CSH [mm] | BFh [mm] | BFh/ CSH | CSWh/ CSH | SWh/ SH | Durability performance of side crack | Longitudinal spring performance | Rolling resistance performance | Wear resistance performance |
|---|---|---|---|---|---|---|---|---|---|---|---|---|---|
| Example 3-1 | 0.026 | 75 | 78 | 1.04 | 114 | 45 | 0.39 | 0.605 | 0.512 | 100 | 100.0 | 80 | 85 |
| Example 3-2 | 0.026 | 75 | 78 | 1.04 | 114 | 25 | 0.22 | 0.605 | 0.512 | 110 | 98.9 | 79 | 85 |
| Example 3-3 | 0.026 | 75 | 78 | 1.04 | 114 | 15 | 0.13 | 0.605 | 0.512 | 114 | 95.3 | 78.5 | 85 |
| Example 3-4 | 0.026 | 75 | 78 | 1.04 | 114 | 5 | 0.04 | 0.605 | 0.512 | 118 | 97.5 | 78.1 | 85 |
| Example 3-5 | 0.026 | 75 | 78 | 1.04 | 114 | 46 | 0.40 | 0.605 | 0.512 | 99.5 | 100.0 | 80 | 85 |
| Example 3-6 | 0.026 | 75 | 78 | 1.04 | 114 | 45 | 0.39 | 0.746 | 0.654 | 100 | 100.5 | 78 | 84 |
| Example 3-7 | 0.026 | 75 | 78 | 1.04 | 114 | 45 | 0.39 | 0.860 | 0.758 | 100 | 101.0 | 84 | 88 |
| Example 3-8 | 0.026 | 75 | 78 | 1.04 | 114 | 45 | 0.39 | 0.544 | 0.496 | 100 | 100.5 | 82 | 86 |
| Example 3-9 | 0.026 | 75 | 78 | 1.04 | 114 | 45 | 0.39 | 0.904 | 0.787 | 100 | 101.5 | 87 | 92 |
| Example 3-10 | 0.026 | 75 | 78 | 1.04 | 114 | 55 | 0.48 | 0.605 | 0.512 | 88 | 102.2 | 83 | 86 |

TABLE 1-3-continued

|  | BD/BW | SWh [mm] | CSEh [mm] | CSEh/ SWh | CSH [mm] | BFh [mm] | BFh/ CSH | CSWh/ CSH | SWh/ SH | Durability performance of side crack | Longitudinal spring performance | Rolling resistance performance | Wear resistance performance |
|---|---|---|---|---|---|---|---|---|---|---|---|---|---|
| Example 3-11 | 0.026 | 75 | 78 | 1.04 | 114 | 47 | 0.41 | 0.605 | 0.512 | 96 | 100.5 | 100 | 85 |

It is found from Tables 1-1 to 1-3 that all Example tires show improved rolling resistance performance as well as abrasion resistance performance compared with Conventional Example tire.

According to Table 1-1, up to the ratio CSEh/SWh of 1.25 (Example tires 1-1 to 1-3, 1-5 to 1-8), durability performance of cracks in the side portion is improved. However, when the ratio CSEh/SWh becomes 1.36 from 1.25 (comparison of Example tires 1-3 and 1-4), durability performance of cracks in the side portion is not improved and longitudinal spring performance is largely increased by 2.6. Therefore, the effect of the present invention is sufficiently obtained when the ratio CSEh/SWh is 1.25 or less.

On the other hand, in Comparative Example tires 1-1 and 1-2, in which the ratio CSEh/SWh is not more than 1, durability performance of cracks in the side portion tends to be surely reduced. From the above-mentioned result, by setting the ratio CSEh/SWh to more than 1, it is confirmed that durability performance of cracks in the side portion can be improved.

It is found from Table 1-2 that durability of cracks in the side portion is equal or improved in comparison to that of Example tire 1-1 when the ratio CRFw/CSH is 0.2 or more (Example tires 2-1 to 2-9, 2-11 and 2-12). It is also confirmed that longitudinal spring performance presents good result (increase is 5% or less) when the ratio CRFw/CSH is 0.6 or less and the angle of the reinforcing element is in a range between 30° and 90° (Example tires 2-1 to 2-10).

It is found from Table 1-3 that, as the ratio BFh/CSH is reduced (Example tires 3-1 to 3-5), durability of cracks in the side portion is surely improved and Example tire 3-4 presents the best result of durability, which is near to a production limit. In addition, longitudinal spring is reduced and rolling resistance performance is slightly improved by decreasing the size of the bead filler. Furthermore, when the ratio BFh/CSH exceeds 0.40 (Example tires 3-10 and 3-11), since durability of cracks in the side portion is degraded even though it is within the allowable range, it can be judged that the upper limit value of the ratio BFh/CSH is preferably 0.40.

DESCRIPTION OF REFERENCE NUMERALS 1 bead core
2 carcass
2a carcass ply
2b carcass ply (outermost layer)
2h body portion of carcass ply
2o turn-up portion of carcass ply
3a inclined belt layer
3b inclined belt layer (outermost layer)
4 circumferential belt layer
5 tread
6 tire
7 rim
8 carcass ply reinforcing layer
9 bead filler
10 bead toe
CL tire equatorial plane

The invention claimed is:

1. A pneumatic tire comprising a carcass as a framework consisting of at least one carcass ply troidally extending between bead portions embedded with a pair of bead cores and turned around the bead cores from an inner side to an outer side in a tire width direction, a belt comprising at least one inclined belt layer and a tread successively disposed on a radially outer side of a crown portion of the carcass, wherein
   a ratio BD/BW is in a range between 0.01 and 0.04 in a section of the tire in the width direction in a state where the tire is mounted on an application rim, where BD is radius difference between radius at a central portion and radius at an end portion in the tire width direction of the outermost layer of the inclined belt layer and BW is a width of the outermost layer and
   CSEh is larger than SWh, where CSEh is a shortest distance from an end of a turn-up portion of the at least one carcass ply to a line drawn in parallel with a tire rotation axis at a bead toe and SWh is a shortest distance between a line drawn in parallel with the tire rotation axis at a maximum width position of the tire and the line drawn in parallel with the tire rotation axis at the bead toe,
   wherein a ratio SWh/SH of the shortest distance SWH to a section height SH of the tire lies within a range of 0.758-0.811, inclusive.

2. The pneumatic tire according to claim 1, further comprising a carcass ply reinforcing layer disposed on a widthwise outer side of the carcass at the maximum width position of the tire, wherein
   a ratio CRFw/CSH is in a range between 0.2 and 0.6, where CRFw is a width of the carcass ply reinforcing layer and CSH is a distance from a radially outermost side of the carcass to the line drawn in parallel with the tire rotation axis at the bead toe and
   an reinforcing element embedded in the carcass ply reinforcing layer is inclined at an angle of 30° to 90° with respect to a tire equatorial plane.

3. The pneumatic tire according to claim 1, wherein
   a ratio BFh/CSH is in a range between 0.04 and 0.40, where BFh is a height of a bead filler and CSH is a distance from a radially outermost side of the carcass to the line drawn in parallel with the tire rotation axis at the bead toe.

4. The pneumatic tire according to claim 1, wherein
   a ratio CSWh/CSH is in a range between 0.6 and 0.9, where CSWh is a shortest distance between a line drawn in parallel with the tire rotation axis at the maximum width position of the carcass and the line drawn in parallel with the tire rotation axis at the bead toe and CSH is a distance from a radially outermost side of the carcass to the line drawn in parallel with the tire rotation axis at the bead toe.

5. The pneumatic tire according to claim 1, wherein a ratio CSEh/SWh is equal to or greater than 1.04.

6. The pneumatic tire according to claim 1, wherein a profile line of a shoulder of the pneumatic tire as viewed in a cross-section comprises curved lines that are convex to the outside of the pneumatic tire.

7. The pneumatic tire according to claim 1, wherein the carcass comprises two carcass plies including an outermost carcass ply and an innermost carcass ply; a turn-up edge of the outermost carcass ply is radially outside CSWh and SWh and a turn-up edge of the innermost carcass ply is radially inside CSWh and SWh, where CSWh is a shortest distance between a line drawn in parallel with the tire rotation axis at the maximum width position of the carcass and the line drawn in parallel with the tire rotation axis at the bead toe.

* * * * *